(12) United States Patent
Geng et al.

(10) Patent No.: US 11,314,675 B2
(45) Date of Patent: Apr. 26, 2022

(54) INTERFACE CIRCUITRY FOR EXCHANGING INFORMATION WITH MASTER, HOME, AND SLAVE NODES USING DIFFERENT DATA TRANSFER PROTOCOLS

(71) Applicant: Arm Limited, Cambridge (GB)

(72) Inventors: Guanghui Geng, Sheffield (GB); Andrew David Tune, Dronfield (GB); Daniel Adam Sara, Sheffield (GB); Phanindra Kumar Mannava, Austin, TX (US); Bruce James Mathewson, Papworth Everard (GB); Jamshed Jalal, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/659,762

(22) Filed: Oct. 22, 2019

(65) Prior Publication Data

US 2020/0050568 A1 Feb. 13, 2020

Related U.S. Application Data

(63) Continuation of application No. 15/384,688, filed on Dec. 20, 2016, now Pat. No. 10,489,323.

(51) Int. Cl.
*G06F 13/42* (2006.01)
*G06F 13/364* (2006.01)
*G06F 13/40* (2006.01)
*G06F 12/0888* (2016.01)
*G06F 12/0815* (2016.01)

(52) U.S. Cl.
CPC ........ *G06F 13/364* (2013.01); *G06F 12/0815* (2013.01); *G06F 12/0888* (2013.01); *G06F 13/404* (2013.01); *G06F 13/4282* (2013.01); *G06F 2212/6046* (2013.01); *G06F 2212/621* (2013.01)

(58) Field of Classification Search
None
See application file for complete search history.

(56) References Cited

U.S. PATENT DOCUMENTS

| 2006/0265554 A1 | 11/2006 | Carter et al. |
| 2009/0240869 A1 | 9/2009 | O'Krafka et al. |
| 2009/0240873 A1 | 9/2009 | Yu |
| 2011/0055439 A1 | 3/2011 | Chen et al. |

(Continued)

FOREIGN PATENT DOCUMENTS

| EP | 0 534 662 | 3/1993 |
| GB | 2 349 721 | 11/2000 |

(Continued)

OTHER PUBLICATIONS

U.S. Appl. No. 15/384,688, filed Dec. 20, 2016, Geng et al.

(Continued)

*Primary Examiner* — Scott C Sun
(74) *Attorney, Agent, or Firm* — Nixon & Vanderhye P.C.

(57) ABSTRACT

A data processing system comprises a master node to initiate data transmissions; one or more slave nodes to receive the data transmissions; and a home node to control coherency amongst data stored by the data processing system; in which at least one data transmission from the master node to one of the one or more slave nodes bypasses the home node.

8 Claims, 12 Drawing Sheets

(56) References Cited

U.S. PATENT DOCUMENTS

| | | | |
|---|---|---|---|
| 2011/0153958 A1 | 6/2011 | Lee et al. | |
| 2012/0079211 A1 | 3/2012 | Laycock et al. | |
| 2013/0042077 A1 | 2/2013 | Mannava et al. | |
| 2013/0073811 A1 | 3/2013 | Beckmann et al. | |
| 2013/0170336 A1* | 7/2013 | Chen | H04L 41/12 370/221 |
| 2013/0322461 A1* | 12/2013 | Poulsen | H04L 12/40169 370/458 |
| 2014/0181349 A1 | 6/2014 | Balkan et al. | |
| 2016/0378971 A1* | 12/2016 | Dunstan | G06F 13/102 726/17 |
| 2017/0171095 A1* | 6/2017 | Prasadh | H04L 69/08 |

FOREIGN PATENT DOCUMENTS

| | | |
|---|---|---|
| JP | H04-107032 | 4/1992 |
| JP | 2002-268933 | 9/2002 |
| JP | 2012-74036 | 4/2012 |
| JP | 2013-41581 | 2/2013 |
| WO | 2013/177295 | 11/2013 |

OTHER PUBLICATIONS

Office Action dated Oct. 5, 2018 in U.S. Appl. No. 15/384,688, 11 pages.
Final Office Action dated Apr. 3, 2019 in U.S. Appl. No. 15/384,688, 7 pages.
UK Combined Search and Examination Report dated May 23, 2018 in GB 1720649.1, 9 pages.
L. Cheng et al., "An Adaptive Cache Coherence Protocol Optimized for Producer-Consumer Sharing" IEEE 13$^{th}$ International Symposium on High Performance Computer Architecture, Feb. 10-14, 2007, pp. 328-339.
Search Report dated Jan. 18, 2019 in GB Application No. 1720649. 1, 2 pages.
Examination Report dated Jan. 18, 2019 in GB Application No. 1720649.1, 4 pages.
Office Action for IN Application No. 201714045392 dated Aug. 31, 2021, 5 pages.
Office Action for KR Application No. 10-2017-0173934 dated Nov. 30, 2021 and English translation, 12 pages.
Office Action for JP Application No. 2017-238817 dated Jan. 12, 2022 and English translation, 14 pages.

* cited by examiner

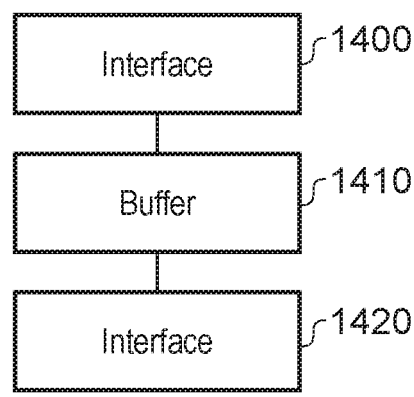
FIG. 14
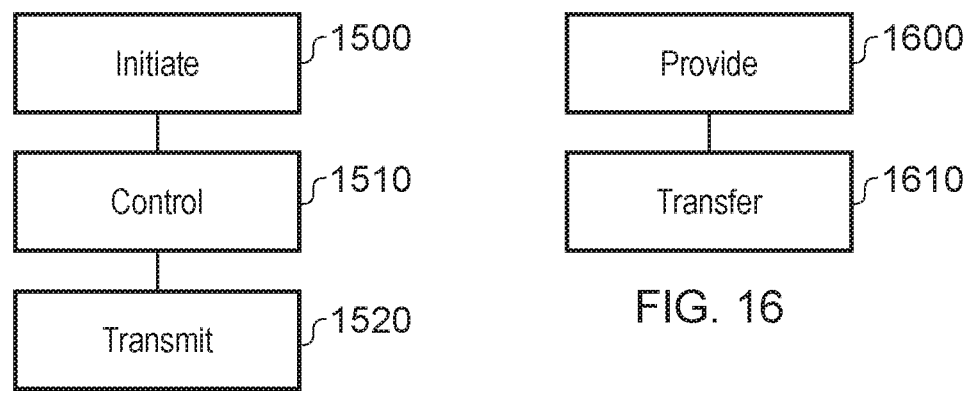
FIG. 15
FIG. 16

INTERFACE CIRCUITRY FOR EXCHANGING INFORMATION WITH MASTER, HOME, AND SLAVE NODES USING DIFFERENT DATA TRANSFER PROTOCOLS

CROSS-REFERENCE

This application is a continuation of U.S. application Ser. No. 15/384,688, filed Dec. 20, 2016, the entire contents of which are hereby incorporated by reference in this application.

BACKGROUND

This disclosure relates to data processing.

Data transfer protocols can regulate the operation of data transfers between devices or nodes connected to one another via interconnect circuitry, for example in the context of a system on chip (SoC) or network on chip (NoC) system. An example of such a data transfer protocol is the so-called AMBA (Advanced Microcontroller Bus Architecture) CHI (Coherent Hub Interface) protocol.

In the CHI protocol, nodes can be categorised as request nodes (RN), home nodes (HN) or slave nodes (SN). Nodes can be fully coherent or input/output (I/O) coherent. A fully coherent HN or RN (HN-F, RN-F respectively) includes coherent cache storage; a fully coherent SN (SN-F) is paired with an HN-F. An HN-F can manage coherency for a memory region.

Here, the term "coherent" implies that that data written to a memory address in the coherent memory system by one node is consistent with data read from that memory address in the coherent memory system by another of the nodes. A role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then coherence logic avoids conflicts with other existing copies of the data item.

The CHI protocol aims to avoid the interconnect becoming a bottleneck inhibiting data transfers, by providing that a write data channel should be free-flowing. This is achieved in CHI-compliant systems by the HN allocating a full packet buffer to an RN in response to receiving a write request from that RN relating to a data write to an SN. The packet buffer is released when all of the data flits (flow control digits) relevant to the transfer have been received from the RN and sent on to the SN. This arrangement brings significant requirements for buffer space at the HN.

Other example protocols include the AXI (Advanced Extensible Interface) or ACE (AXI Coherency Extensions) protocols. In some respects the CHI and AXI/ACE protocols are incompatible. The ACE protocol does not make use of a HN for example, but does provide coherency. While each requires that write data is free-flowing, the interconnect (which manages coherency in the ACE protocol) must route write data as part of the same transaction as a write request.

SUMMARY

In an example arrangement there is provided a data processing system comprising:

a master node to initiate data transmissions;

one or more slave nodes to receive the data transmissions; and a home node to control coherency amongst data stored by the data processing system;

in which at least one data transmission from the master node to one of the one or more slave nodes bypasses the home node.

In another example arrangement there is provided interface circuitry comprising:

circuitry to exchange information with a master node of a data processing system and with a home node and one or more slave nodes, the home node controlling coherency amongst data stored by the data processing system;

the interface circuitry being configured to receive a transmission request and a data transmission from the master node according to a first data transfer protocol and to transfer data from the received data transmission to a given slave node according to a second, different, data transfer protocol.

In another example arrangement there is provided a data processing method comprising:

a master node initiating data transmissions to one or more slave nodes;

a home node controlling coherency amongst data stored at the one or more slave nodes;

the master node transmitting data to one of the one or more slave nodes bypassing the home node.

In another example arrangement there is provided a method comprising:

providing interface circuitry to exchange information with a master node of a data processing system and with a home node and one or more slave nodes, the home node controlling coherency amongst data stored by the data processing system;

the interface circuitry receiving a transmission request and a data transmission from the master node according to a first data transfer protocol and transferring data from the received data transmission to a given slave node according to a second, different, data transfer protocol.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 14 schematically illustrates an interface circuitry; and

FIGS. 15 and 16 are schematic flowcharts illustrating methods.

DESCRIPTION OF EMBODIMENTS

Figure 1:
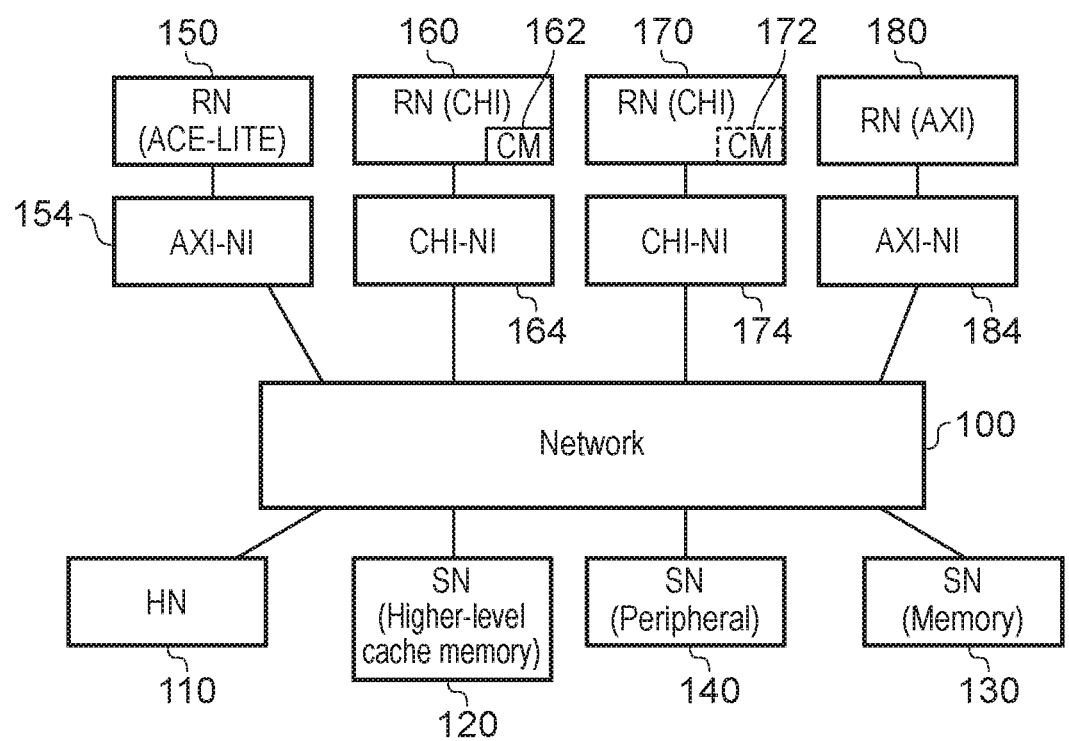
FIG. 1 schematically illustrates a data processing apparatus.

Before discussing the embodiments with reference to the accompanying figures, the following description of embodiments is provided.

An example embodiment provides a data processing system comprising:

a master node to initiate data transmissions;

one or more slave nodes to receive the data transmissions; and a home node to control coherency amongst data stored by the data processing system;

in which at least one data transmission from the master node to one of the one or more slave nodes bypasses the home node.

Example arrangements can provide for a reduced need for buffering at a home node and/or a reduced data traffic during write data transactions, by allowing a home node to oversee coherency but also allowing a master node to issue a data transfer directly to a slave node.

In some example, the system can make use of the coherent techniques by the master node being configured to issue a transmission request, requesting a data transmission to one of the one or more slave nodes, to the home node; and the home node is configured to serialise transmission requests and access requests to the one or more slave nodes so that data written to a memory address at a slave node is consistent with data read from that memory address in response to a subsequent access request.

In some examples, the bypassing technique can be implemented by the home node being configured, in response to serialisation of a given transmission request requesting a data transmission to a given slave node of the one or more slave nodes, to issue an authorisation indicating that the data transmission corresponding to the given transmission request should be made directly to the given slave node. In example implementations, the authorisation issued by the home node includes a source node identifier and a target node identifier; and the source node identifier indicates that the given slave node was the source of the authorisation. In some such examples, the data transmission includes a target node identifier derived from the source node identifier of the authorisation issued by the home node.

To avoid so-called data hazarding, in some examples the home node is configured to inhibit a second data transmission relating to a later-serialised transmission request from writing data to the same memory address as a first data transmission relating to an earlier-serialised transmission request, until after completion of the first data transmission.

In examples, each of the one or more slave nodes is configured to accept each data transmission directed to that slave node independently of any other data transmissions directed to that slave node.

These arrangements can conveniently provide for data transmissions across protocol formats, by using interface circuitry between the master node and the home and the one or more slave nodes; the interface circuitry being configured to receive a transmission request and a data transmission from the master node according to a first data transfer protocol and to transfer data from the received data transmission to the given slave node according to a second, different, data transfer protocol.

In examples, the interface circuitry is configured to generate a transmission message, for transmission to the given slave node, the transmission message including at least memory address information from the received transmission request and data from the received data transmission. The interface circuitry may comprise a buffer to buffer at least one of: address information from the received transmission request; and data from the received data transmission.

Cleaning of so-called dirty coherent data can be provided for by an arrangement in which the master node has an associated cache memory and at least one of the one or more slave nodes provides a higher level memory; the system comprising at least one further master node; in which, in response to a data access request from the further master node to retrieve data from a memory address stored in the cache memory, the interface circuitry is configured to receive data retrieved from the cache memory and to provide the retrieved data to the further master node.

In at least some examples, if the retrieved data in the cache memory is detected to be different to data held at the same memory address in the higher level memory, the interface circuitry is configured to transmit the retrieved data as a data transmission to the higher level memory.

In some examples, the bypassing technique can be achieved by, in respect of a data transmission from the master node to the one of the slave nodes, the slave node being configured to issue a credit for the data transfer, the credit being provided to the master node by a path which bypasses the home node.

Conveniently, to reduce data traffic, the slave node can be configured to issue a single message comprising the credit and an acknowledgement.

In at least some examples, one or more of the slave nodes are configured to operate according a different communication protocol to the master node. For example, the master node may be configured to operate according to a Coherent Hub Interface protocol and one or more of the slave nodes may be configured to operate according to an Advanced Extensible Interface protocol.

Another example embodiment provides interface circuitry comprising:

circuitry to exchange information with a master node of a data processing system and with a home node and one or more slave nodes, the home node controlling coherency amongst data stored by the data processing system;

the interface circuitry being configured to receive a transmission request and a data transmission from the master node according to a first data transfer protocol and to transfer data from the received data transmission to a given slave node according to a second, different, data transfer protocol.

In some examples the interface circuitry is configured to generate a transmission message, for transmission to a given slave node, the transmission message including at least memory address information from transmission request received from the master node and data from the data transmission received from the master node.

Another example embodiment provides a data processing method comprising:

a master node initiating data transmissions to one or more slave nodes;

a home node controlling coherency amongst data stored at the one or more slave nodes;

the master node transmitting data to one of the one or more slave nodes bypassing the home node.

Another example embodiment provides a method comprising:

providing interface circuitry to exchange information with a master node of a data processing system and with a home node and one or more slave nodes, the home node controlling coherency amongst data stored by the data processing system;

the interface circuitry receiving a transmission request and a data transmission from the master node according to a first data transfer protocol and transferring data from the received data transmission to a given slave node according to a second, different, data transfer protocol.

Referring now to the drawings, FIG. 1 schematically illustrates a data processing apparatus embodied as a network of devices interconnected by a network 100. The apparatus may be provided as a single integrated circuit such as a so-called system on chip (SoC) or network on chip (NoC) or as a plurality of interconnected discrete devices.

Various so-called nodes are connected via the network 100. These include one or more home nodes (HN) 110 which oversee data coherency within the networked system, one or more slave nodes (SN) such as a higher level cache memory 120 (the reference to "higher level" being with respect to a cache memory provided by a requesting node and described below), a main memory 130 and a peripheral device 140. The selection of slave nodes shown in FIG. 1 is by way of example, and zero or more of each type of slave node may be provided.

FIG. 1 also shows a plurality of so-called requesting nodes (RN) 150, 160, 170, 180. Of these, the RNs 160, 170 operate according to the CHI (coherent hub interface) protocol and the RN 180 operates according to the AXI (advanced extensible interface) standard.

The RN 160 is a fully coherent RN (RN-F) having an associated cache memory 162. The RN 170 may also be an RN-F and may have a cache memory 172. The RN 150 is an input/output coherent master operating according to the so-called ACE-lite protocol.

Network interfaces (NI) are provided for the nodes 150, 160, 170, 180. The NI for the nodes 160, 170 is a CHI-NI 164, 174 and the NI for the nodes 150, 180 are AXI-Nis 154, 184. Operation of the network interfaces will be discussed further below.

As mentioned above, the nodes can be fully coherent or input/output (I/O) coherent. A fully coherent HN or RN (HN-F, RN-F respectively) includes coherent cache storage. A fully coherent SN (SN-F) is paired with an HN-F. An HN-F can manage coherency for a memory region.

In example arrangements, each of the one or more slave nodes is configured to accept each data transmission directed to that slave node independently of any other data transmissions directed to that slave node.

As discussed below, the Nis can provide examples of interface circuitry between the master node and the home and the one or more slave nodes; the interface circuitry being configured to receive a transmission request and a data transmission from the master node according to a first data transfer protocol and to transfer data from the received data transmission to the given slave node according to a second, different, data transfer protocol. For example as discussed below with reference to FIG. 3, a CHI-NI can issue write data packets to an AXI compliant slave node.

Therefore, in at least some examples, FIG. 1 represents an example in which one or more of the slave nodes are configured to operate according a different communication protocol to the master node. For example, the master node may be configured to operate according to a Coherent Hub Interface protocol and one or more of the slave nodes may be configured to operate according to an Advanced Extensible Interface protocol. Examples discussed below can also be applied to this configuration of master and slave.

Figure 2:
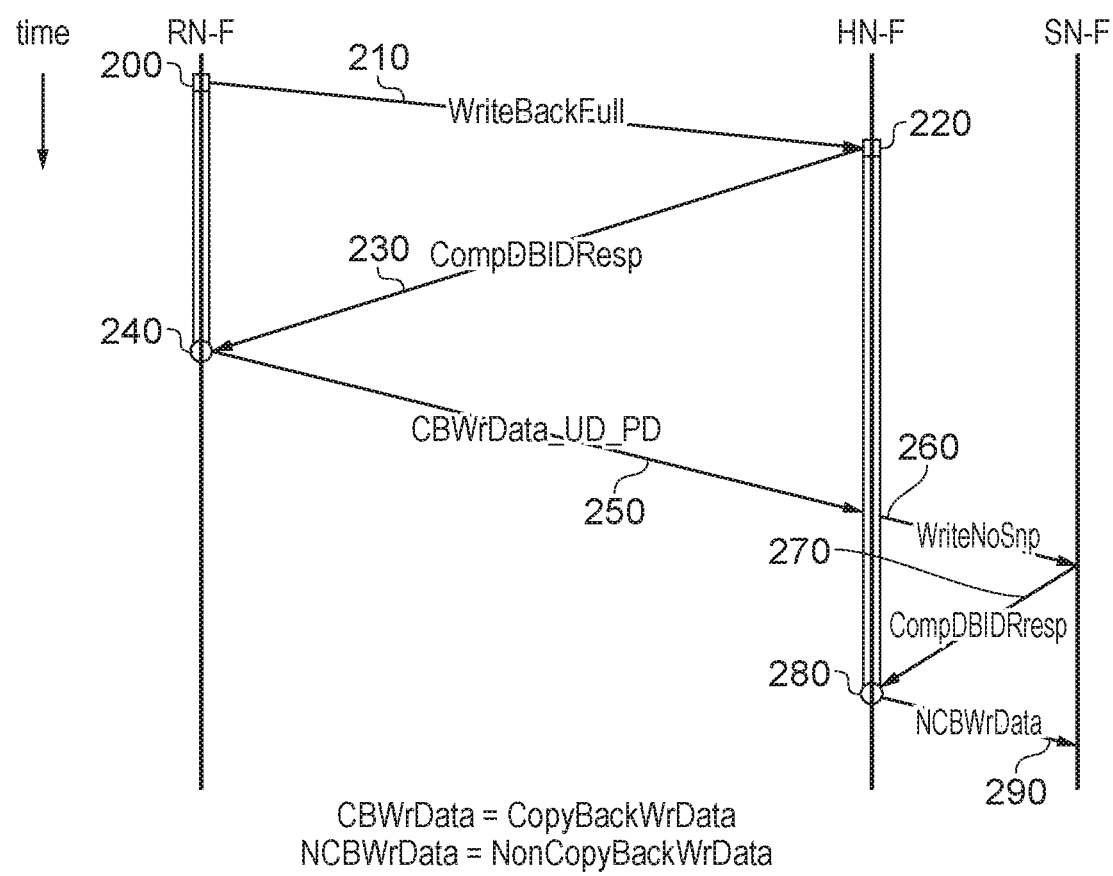
FIG. 2 schematically illustrates a write data transaction.

FIG. 2 is a schematic diagram representing a data write request according to the previously proposed CHI protocol. In this and in corresponding similar diagrams to be discussed below, time, or at least progress of the processing, is shown in a vertical direction from earlier (at the top of the diagram) to later (at the bottom of the diagram). Different nodes within the system are represented by vertical lines, so the example of FIG. 2 a write transaction taking place from a requesting node RN-F to a slave node SN-F, via a home node HN-F, is represented.

The write transaction is initiated by the RN-F at a time 200 by the RN-F sending a write request 210 to the HN-F. The HN-F allocates a buffer storage to the write request at a time 220 and returns a completion indication (CompDBl-DResp) 230 to the RN-F.

Meanwhile, the RN-F has held the write data in a local buffer but on receipt of the completion indication from the HN-F, at a time 240, sends the write data to the HN-F as data 250. The HN-F stores the write data in its allocated buffer on receipt of the data from the RN-F. At that point, the HN-F sends a write request (WriteNoSnp) indicating a write operation with no snoop detection 260 to the SN-F. The SN-F responds with an acknowledgement of acceptance 270 of the write request and, on receipt of that acknowledgement at a time 280, the HN-F sends the buffered write data to the SN-F as data 290.

In this arrangement, buffering is required at the RN-F and the HN-F. To complete the transaction, buffer space must be allocated at the RN-F at least between the times 200 and 240, and buffer space must be allocated at the HN-F at least between the times 210 and 280.

As mentioned above, there is a requirement in the CHI protocol that, from the point of view of an RN, the write data channel must be free flowing. As shown in FIG. 2, this is provided in the previously proposed CHI arrangement by allocating a full packet buffer at the HN for every pending write request. However, this can lead to a significant amount of local buffer memory being required; in some example arrangements, each data buffer is 64 bytes in size so the provision of sufficient buffer storage can be expensive in terms of integrated circuit area and power consumption.

It is also noted that the previously proposed CHI transaction shown schematically in FIG. 2 is not compatible with an AXI endpoint.

Figure 3:
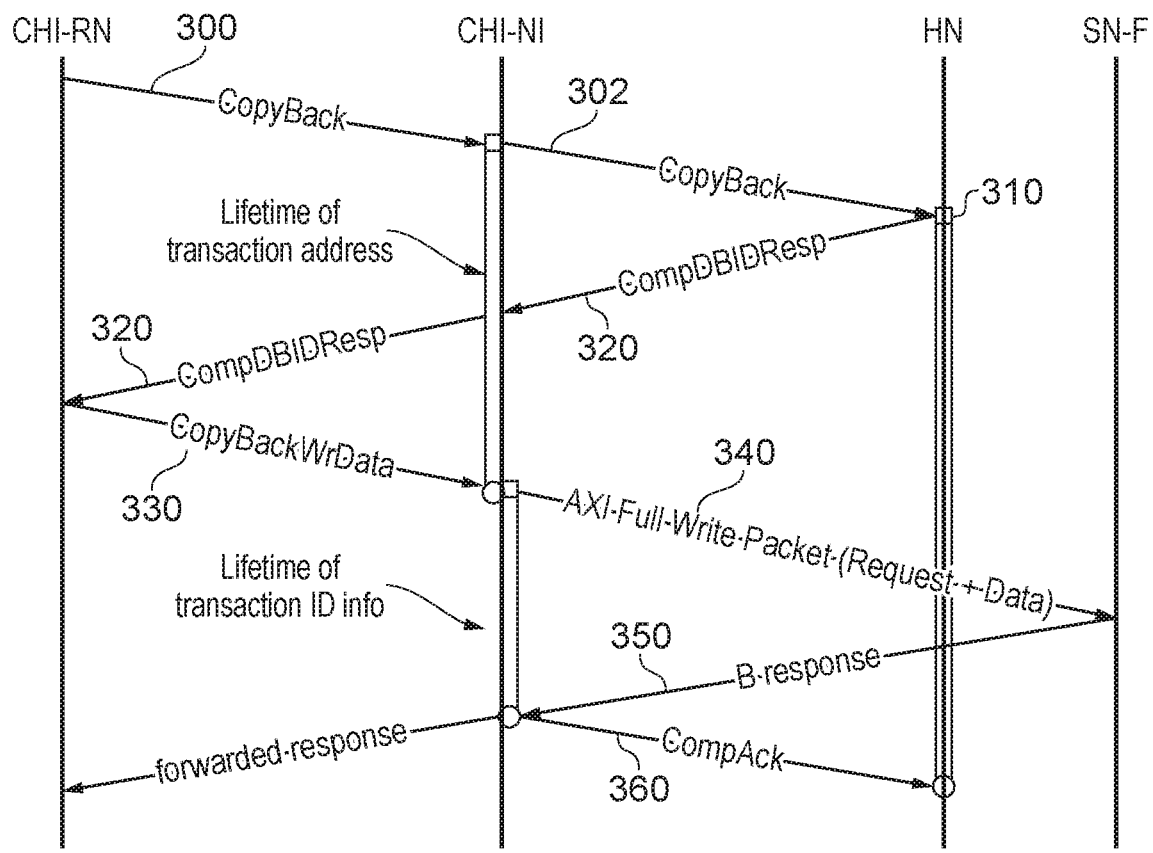
FIG. 3 schematically illustrates a write data transaction bypassing a home node.

FIG. 3 schematically represents a transaction involving the CHI-NI (164, 174 in FIG. 1). The transaction shown in FIG. 3 refers to a requesting node CHI-RN conducting a write transaction to a slave node SN-F. As before, time/progress of the processing is shown in a vertical direction from earlier at the upper part of the diagram to later at the lower part of the diagram.

Referring to FIG. 3, the CHI-RN issues a write request 300 to the CHI-NI. The CHI-NI stores the address of the write transaction and forwards a write request 302 derived from the write request 300 to the HN.

The HN returns a response at a time 310 to the CHI-NI when the request has been serialised with any preceding requests. Unlike the arrangement shown in FIG. 2, however, the response 320 instructs the CHI-NI to send the write data to the final target node SN-F instead of to HN. This is an example in which the home node is configured, in response to serialisation of a given transmission request requesting a data transmission to a given slave node of the one or more slave nodes, to issue an authorisation indicating that the data transmission corresponding to the given transmission request should be made directly to the given slave node. An example technique for achieving this (by changing source and/or target addresses in the messages) will be discussed below.

CHI-NI forwards a response 322 derived from the response 320 to the CHI-RN and also allocates a local packet buffer at the CHI-NI in order to guarantee acceptance of all write data flits (flow control digits) belonging to this transaction. In response to receipt of the response 322, the CHI-RN sends the write data to the CHI-NI as data 330.

When all the write data flits belonging to the same transaction have been received in its packet buffer, CHI-NI sends the full write packet to the final target node, in this example as an AXI full write packet 340. In this example, therefore, the interface circuitry is configured to generate a transmission message, for transmission to the given slave node, the transmission message including at least memory address information from the received transmission request and data from the received data transmission. The CHI-NI de-allocates the packet buffer and the transaction address tracking but can maintain a track of a transaction identifier (ID) relating to the transaction between the CHI-NI and the target node SN-F.

The target node accepts the write packet (which is sent on a separate channel to the write request which was previously sent to the HN in order to avoid deadlock) without any dependency on other requests. The target node sends a response 350 to the CHI-NI when the transaction is finished. The CHI-NI can forward the received response to the RN and sends a completion acknowledgement 360 to the HN. At this point it also de-allocates the request from the ID tracking.

In some examples, an acknowledgement may be required (under the particular protocol in use) from the RN to the HN, in which case the CHI-NI waits to receive that acknowledgement from the RN before issuing the acknowledgement 360.

On receipt of the acknowledgement 360, the HN de-allocates the request from its own tracker and removes the "hazard" associated with the request (that is to say, the request is now no longer relevant to the serialisation of co-pending requests).

In terms of a buffering requirement, a packet buffer is required to cover the latency between the CHI-NI and the RN. A request buffer only needs to cover the round trip latency between the CHI-NI request and the HN's response.

Therefore the arrangement of FIG. 1, operating according to the example of FIG. 3, represents an example of a data processing system comprising:
  a master node to initiate data transmissions;
  one or more slave nodes to receive the data transmissions; and
  a home node to control coherency amongst data stored by the data processing system;
  in which at least one data transmission from the master node to one of the one or more slave nodes bypasses the home node.

Figure 4:
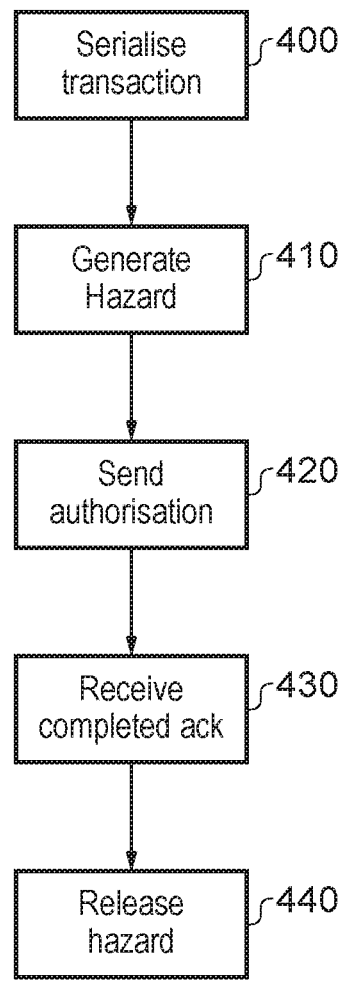
FIG. 4 is a schematic flowchart illustrating a method.

FIG. 4 is a schematic flowchart illustrating operations of a home node (HN) in the context of a write data transaction as discussed above.

At a step 400, the HN serialises the transaction amongst other pending transactions, so that the transaction is played in the correct order of dependency with respect to other transactions accessing the same or overlapping memory areas.

At a step 410, the HN generates a so-called hazard. In this context, a hazard is an indication held by the HN that a particular memory area for line is the subject of a pending transaction which may change the context of that line, so that the hazard indicates to the HN not to allow other transaction to access that line until the current one has been completed.

At a step 420, the HN provides authorisation for the transaction to take place. In the context of FIG. 3 this is the response 320.

At a step 430, the HN receives an acknowledgement of completion of the transaction, which in the context of FIG. 3 is represented by the acknowledgement 360, and at a step 440, the HN releases the hazard associated with the particular memory region or line.

So, it can be seen that the HN retains control over coherency and hazarding as between different addresses, but as discussed with reference to FIG. 3 a write transaction can then be conducted between the requesting node and the target node.

Therefore, in such examples, the master node is configured to issue a transmission request, requesting a data transmission to one of the one or more slave nodes, to the home node; and the home node is configured to serialise transmission requests and access requests to the one or more slave nodes so that data written to a memory address at a slave node is consistent with data read from that memory address in response to a subsequent access request.

Figure 5:
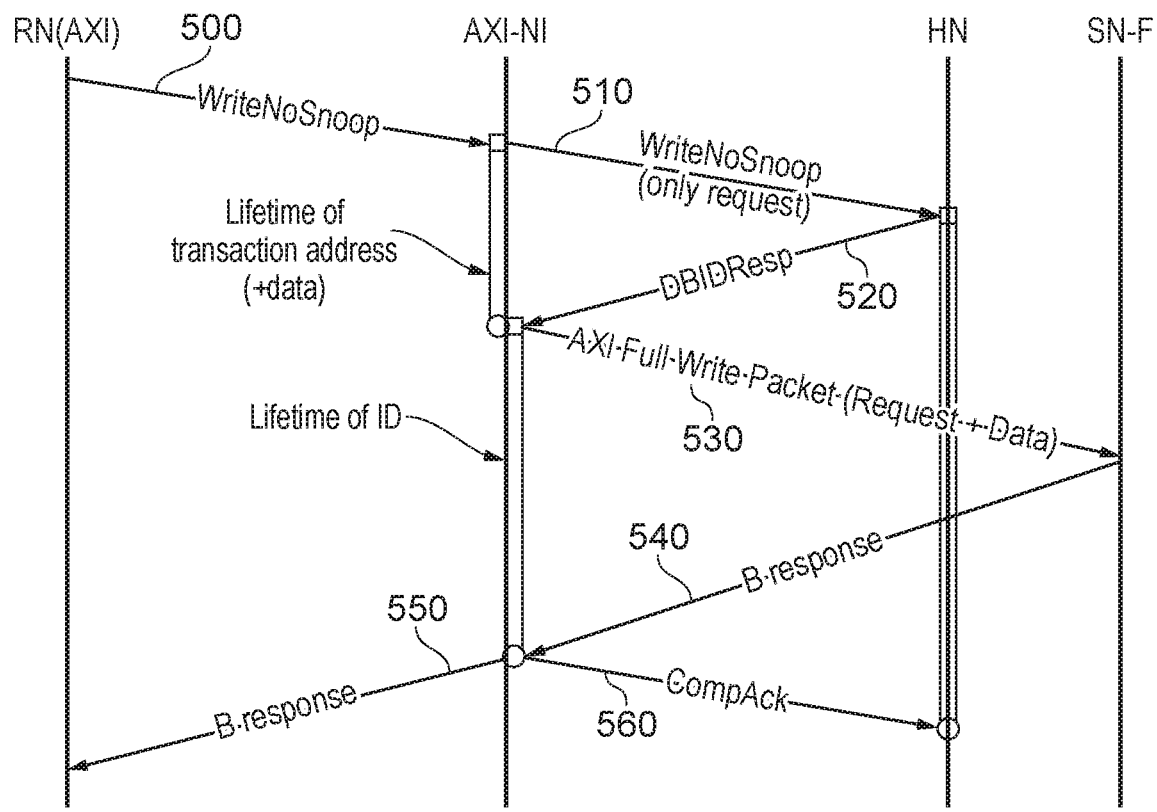
FIG. 5 schematically illustrates a write data transaction bypassing a home node.

FIG. 5 provides a schematic representation of the flow appropriate to a write transaction between the RN (AXI) 180 of FIG. 1 and a target node such as an SN-F. The format is similar to that shown in FIG. 3 so that time or progress runs from an earlier time towards the top of the page to a later time towards the bottom of the page.

The RN (AXI) initiates a write operation by sending a write packet 500 to the AXI-NI. In the case of the AXI protocol, the write packet includes the target address and all of the write data.

The AXI-NI buffers the write packet received from the RN (AXI). It sends a write request 510 to the HN. Note that unlike the AXI write packet 500, the write request 510 is simply the request, not the write data.

The HN handles the write request as it would from a CHI-compliant requesting node and returns a response 520 acknowledging the request and authorising the sending of the write data to the target node. In response to the response 520, the AXI-NI sends the full write packet (request and data) 530 to the target node which in return responds with an acknowledgement of completion 540. The AXI-NI sends that acknowledgement to the RN AXI as an acknowledgement 550 and also sends a completion 560 to the HN.

Figure 6:
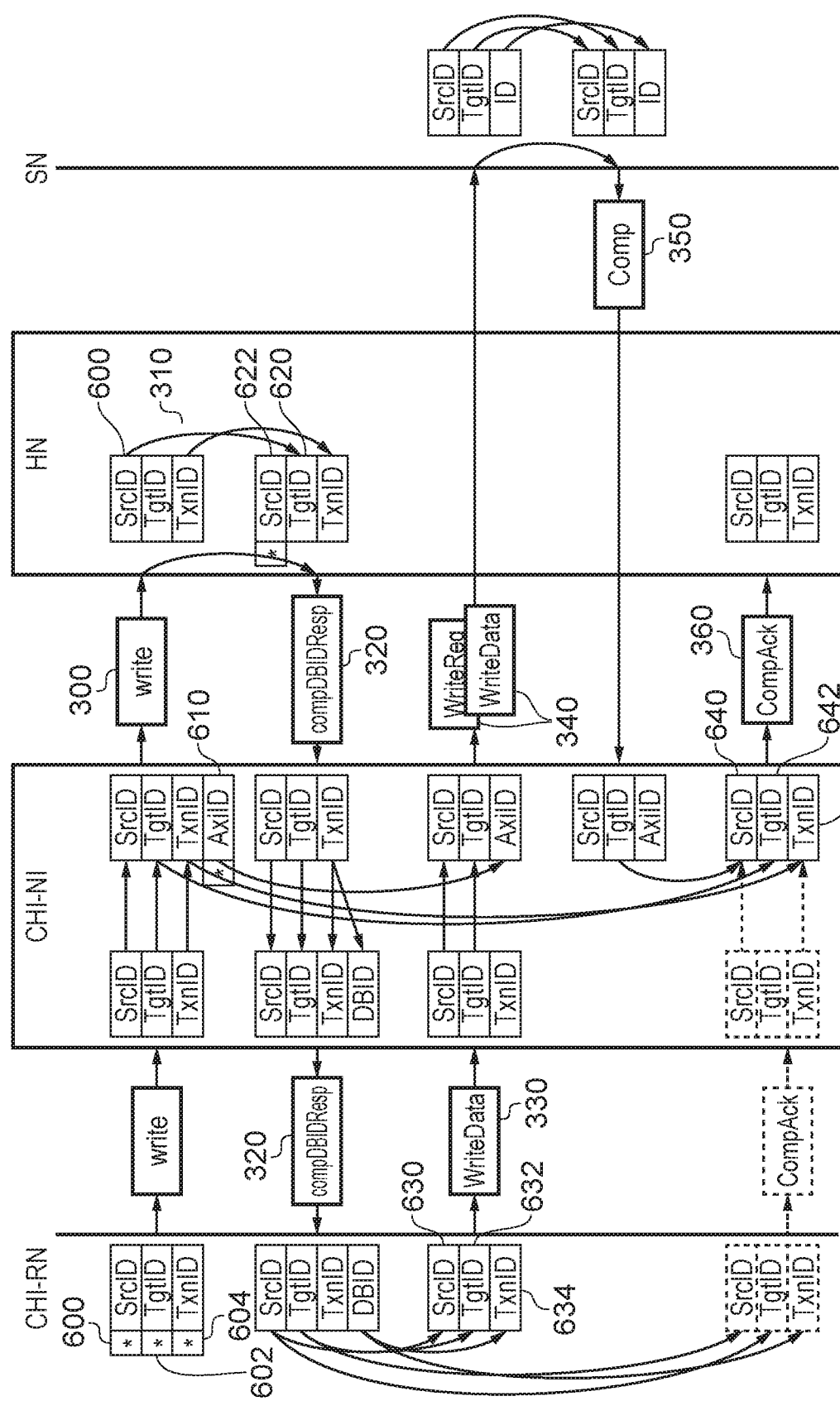
FIGS. 6 and 7 schematically illustrate identifier fields during a transaction.
Figure 7:
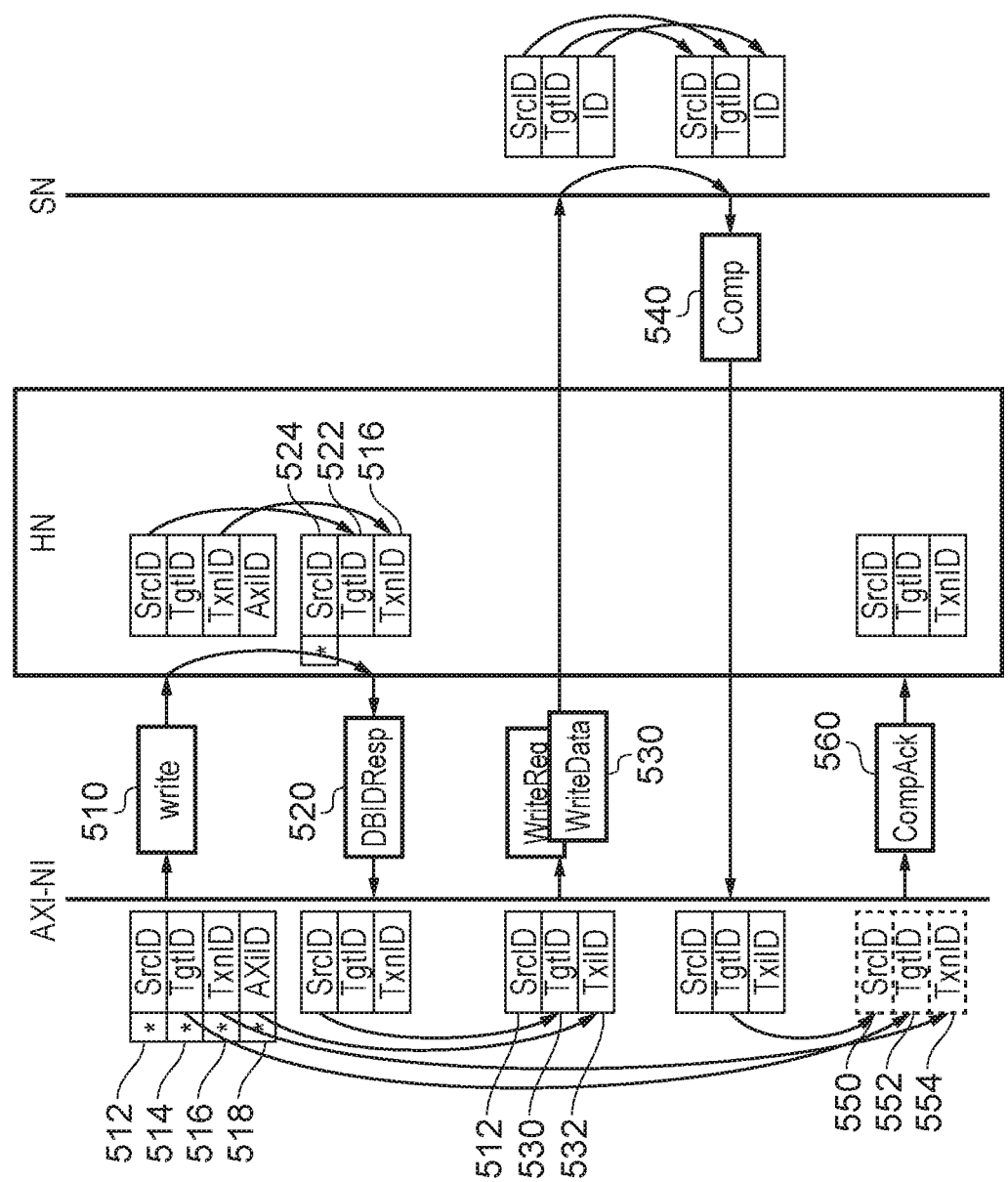

FIGS. 6 and 7 provide schematic indications as to how packet addressing is handled in the arrangements of FIGS. 3 and 5.

FIG. 6 relates to the arrangement shown in FIG. 3 and discussed above. The original request from the CHI-RN has various identifier fields including a source identifier 600, a target identifier (identifying the eventual target (SN) 602) and a transaction ID 604. The CHI-NI receives these identifier fields and associates them with AXI ID 610. The write request 300 sent from the CHI-NI to the HN carries forward the same source ID, target ID and transaction ID as those provided by the RN.

The HN, at the time point 310 in FIG. 3, returns a response to the CHI-NI. In this response, the same transaction ID is maintained, the source ID 600 becomes the target ID 620 of the response 320 (in other words, directing the response back to the originating RN) and the HN adds a own source ID 622; however, this source ID does not indicate the HN as the source of the message, but instead indicates the target SN as the source. This means that when the write data is returned, it will be sent to the SN rather than to the HN. This is an example in which the home node is configured, in response to serialisation of a given transmission request requesting a data transmission to a given slave node of the one or more slave nodes, to issue an authorisation indicating that the data transmission corresponding to the given transmission request should be made directly to the given slave node. Specifically, in these examples, the authorisation issued by the home node includes a source node identifier and a target node identifier; and the source node identifier indicates that the given slave node was the source of the authorisation. one way in which this can operate is where the data transmission includes a target node identifier derived from the source node identifier of the authorisation issued by the home node.

The CHI-NI receives the response 320 and forwards the same identifier fields as its response 320 to the RN, with the transaction ID 604 duplicated as a DBID.

The next stage which was described with reference to FIG. 3 was the CHI-RN forwarding the write data 330. Again, this has a source ID, target ID and transaction ID associated with it. The source ID 630 is taken from the target ID field of the received response, which is an ID representing the CHI-RN. The target ID of the write data 330 (632) is taken from the source ID of the received response 320, and the transaction ID 634 of the write data 330 is taken as the DBID of the response 320. The write data 330 is sent to the CHI-NI.

The CHI-NI then generates the packet 340 in FIG. 3, in which it substitutes the AXI-ID 610 for the transaction ID received from the CHI-RN, but carries forward the source ID 630 and the target ID 632.

The target ID 632, as mentioned above, defines the SN and so the packet 340 is routed to the SN which receives the write packet and executes the required write operation. The SN then generates the completed acknowledgement 350 which it identifies by interchanging the source and target IDs of the received packet 340. This routes the acknowledgement back to the CHI-NI.

The CHI-NI receives the acknowledgement 350 and, by reference to the AXI ID, reinserts the original transaction 604. The target ID of the received acknowledgement (identifying the CHI-NI) becomes the source ID 640 of the acknowledgement 360, and the target ID 642 of the acknowledgement 360 is taken as the target ID 602 of the original request, which means the acknowledgement 360 is routed back to the home node.

FIG. 7 shows schematically a similar arrangement corresponding to the transactions of FIG. 5 described above.

In FIG. 7 the write packet 510 has a source ID 512, a target ID 514, a transaction ID 516 and an AXI ID 518 generated by the AXI-NI.

At the home node, a response 520 is formed in which the transaction ID 516 is maintained, the target ID of the response 522 is taken from the source ID of the packet 510 and the source ID 524 of the response is generated at the HN and represents the target (SN) rather than the HN itself.

As discussed with reference to FIG. 5, the AXI-NI generates the write packet 530 having the original source ID of the AXI-NI 512, a target ID taken from the source ID 524 and a transaction ID 532 equal to the AXI ID 518. This is sent directly to the target (SN) at which the source and target IDs are switched to form the acknowledgement 540 which is sent back to the AXI NI.

At the AXI-NI, an acknowledgement 560 is generated for sending to the HN. This has the target ID of the received acknowledgement 540 as its source ID 550, the original target ID 514 as its target ID 552 and the original transaction ID 516 as its transaction ID 554. The acknowledgement 560 is routed back to the home node as discussed above.

Figure 8:
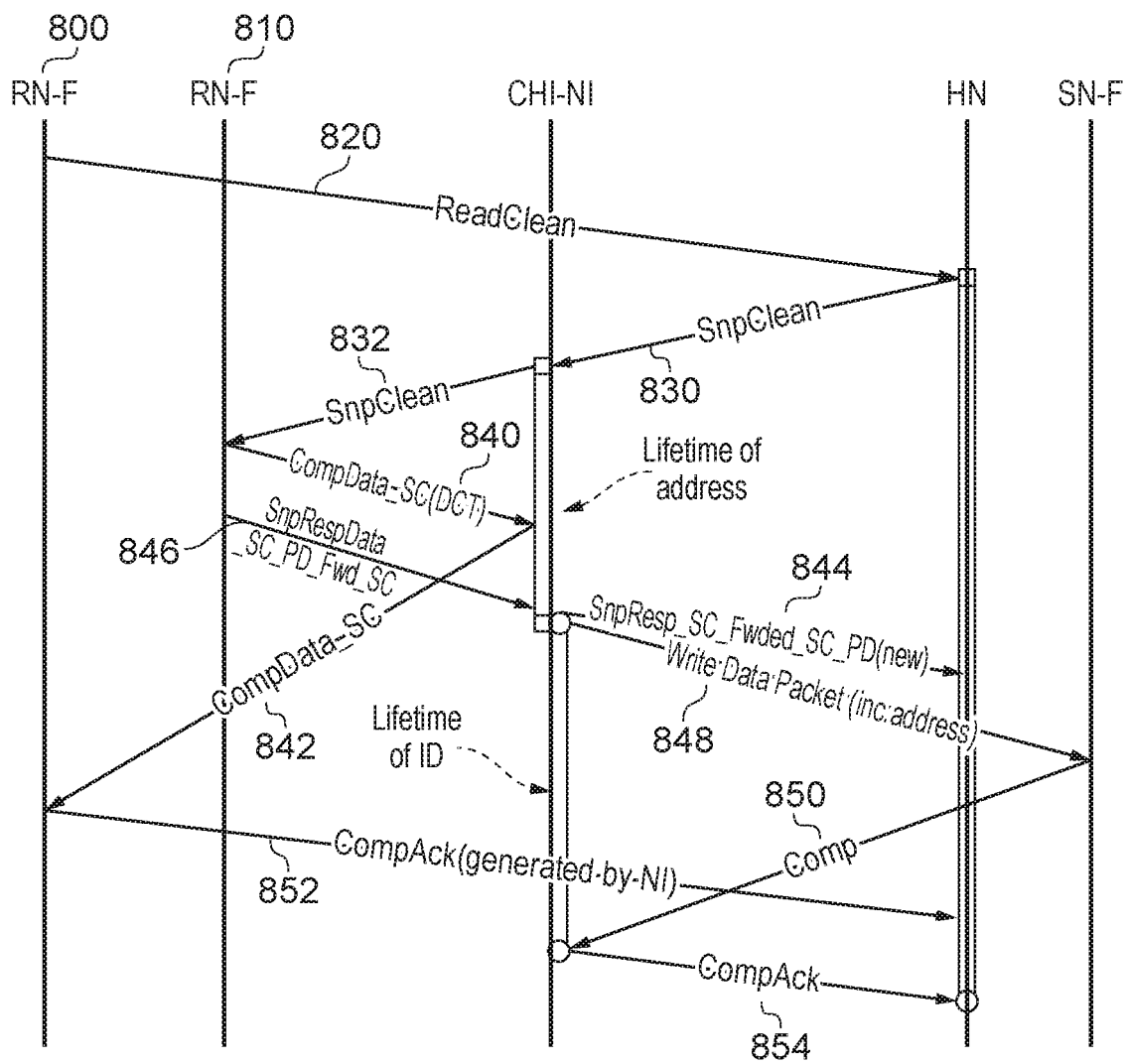
FIGS. 8 and 9 schematically illustrate write data transactions bypassing a home node.

FIG. 8 schematically illustrates an arrangement in which there is potentially "dirty" data (data which has been modified in a local cache and not yet written back to memory).

In FIG. 8 assume that a requesting node 800 (such as an RN-F having an NI) and a fully coherent RN 810 are associated with the system, and that the RN-F 800 is referencing data for which a copy is held in a local cache by the RN-F 810.

The RN issues a request 820 for a clean copy of the particular data under discussion. This request goes to the HN which issues an instruction 830 to "clean" the data which is to say, to make it clean if it is dirty. The instruction 830 can be issued on a broadcast basis to all nodes or can be selectively sent to nodes which do (or may) have a local copy of the relevant data, on the basis a directory or other set of data held by the HN.

The CHI-NI associated with the RN-F 810 receives the instruction 830 and forwards it to the RN-F as instruction 832.

The RN-F responds with three data items: an acknowledgement including the data in question 840 is sent to the CHI-NI which forwards it to the originating RN 800 where the data is stored. A response message 844 is sent from the CHI-NI to the HN (in response to the data 846) indicating that the HN should expect two acknowledgements to indicate completion of the present operations. The data itself 846 is sent to the CHI-NI which issues it as a write data packet including the target address 848 directly to the SN (such as a main memory) which in turn sends an acknowledgement back to the CHI-NI 850.

Two acknowledgements are then sent to the HN: one by the RN 852 and one by the CHI-NI 854. Upon receipt of the second of these, the HN closes the transaction and releases the hazard.

Figure 9:
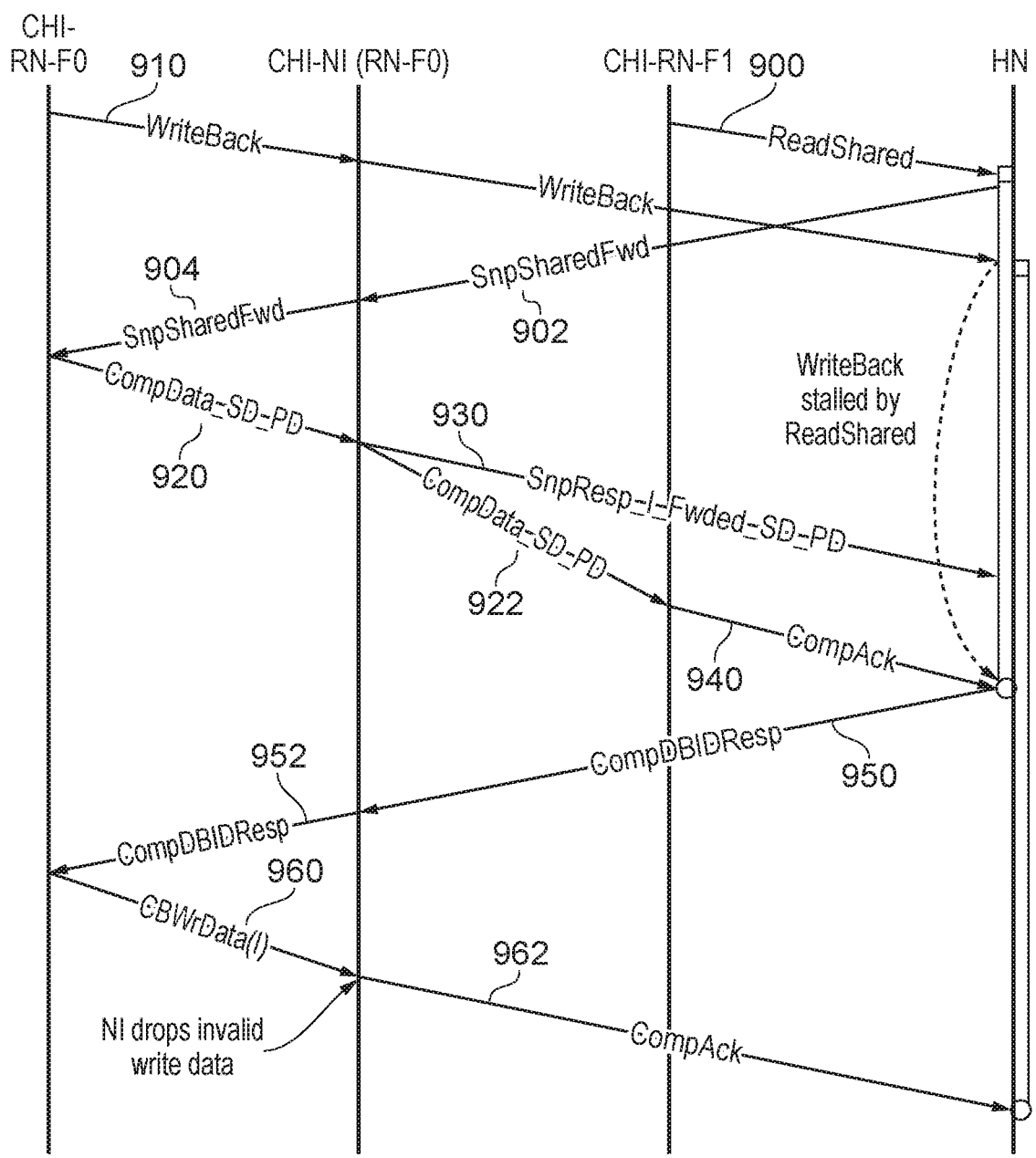

FIG. 9 schematically illustrates a situation in which the HN receives a read request for a particular data item at substantially the same time as a write back request (to a slave node such as a main memory) is issued by another RN.

Referring to FIG. 9, two RNs are shown, RN-F0 and RN-F1, both of which are fully coherent in this example.

The RN-F1 issues a read request 900 to the HN, overlapping with a write back request 910 issued by the RN-F0.

The HN receives the read request 900 and, because a copy of the relevant data is held at the RN-F0, issues a so-called snoop request 902 to the RN-F0 which is received and forwarded as a request 904 by the CHI-NI associated with the RN-F0. In the meantime, the write back request 910 is stalled by the HN while the read request 900 is fulfilled.

A copy of the relevant data 920 is returned by the RN-F0 to the CHI-NI. This then takes two actions. One is to send an indication 930 to the HN that the snoop response has been forwarded to the originated RN (RN-F1) and the other is to send the snooped data 922 to the RN-F1 which in turn sends an acknowledgement 940 to the HN. Once that acknowledgement 940 and the indication 930 have both been received, the stalling of the write back request 910 can be lifted by the HN, so that the HN sends a response 950 to the CHI-NI which forwards a response 950 to the RN-F0.

The RN-F0 returns the write back data 960 to the CHI-NI. However, the CHI-NI is aware from the previous issue of the data 922 that the relevant data has already been returned to the HN for writing back, and so the CHI-NI simply sends a completion acknowledgement 962 to the HN, closing the write transaction.

FIG. 9 therefore provides an example in which the home node is configured to inhibit a second data transmission relating to a later-serialised transmission request from writing data to the same memory address as a first data transmission relating to an earlier-serialised transmission request, until after completion of the first data transmission.

FIGS. 8 and 9 also provide examples in which the master node has an associated cache memory and at least one of the one or more slave nodes provides a higher level memory; the system comprising at least one further master node; in which, in response to a data access request from the further master node to retrieve data from a memory address stored in the cache memory, the interface circuitry is configured to receive data retrieved from the cache memory and to provide the retrieved data to the further master node. In FIG. 8, if the retrieved data in the cache memory is detected to be different to data held at the same memory address in the higher level memory, the interface circuitry is configured to transmit the retrieved data as a data transmission (such as 848) to the higher level memory.

Figure 10:
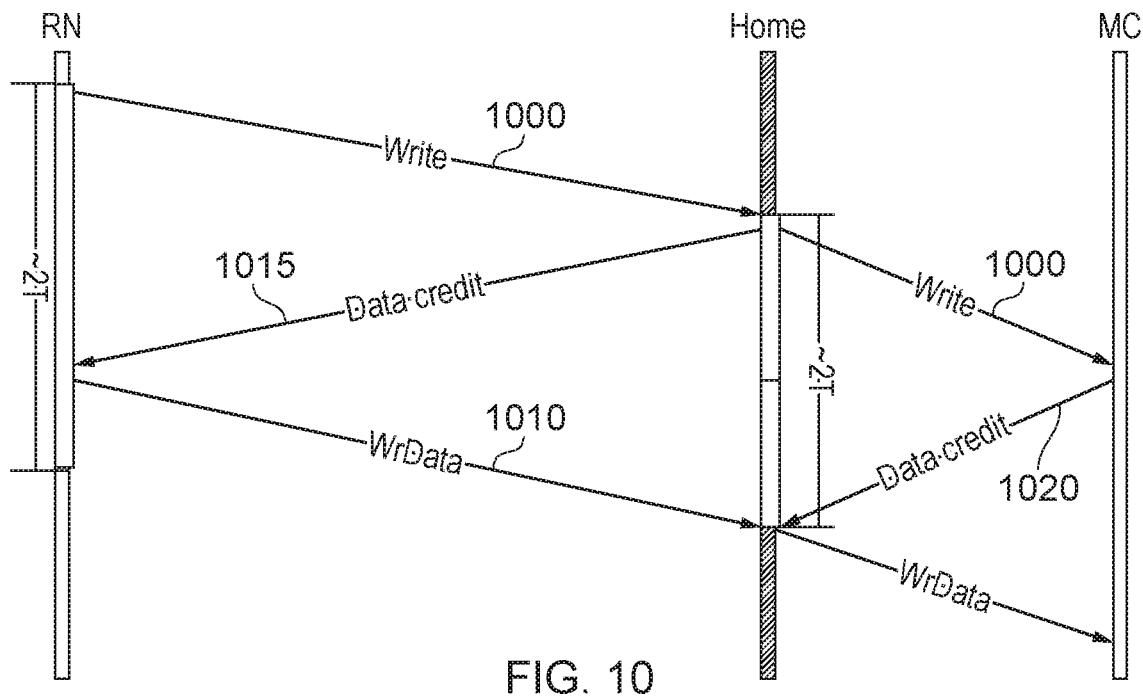
FIG. 10 schematically illustrates a write data transaction.

FIG. 10 is a schematic diagram similar in form to FIG. 2 discussed above, in which a requesting node RN carries out a data write transaction via a home node to a slave node which in this example is a memory controller (MC).

The flow of control is similar to that shown in FIG. 2. The write request 1000 is forwarded from the RN to the MC through the home node. The data associated with the write follows the same path either along with the write request or as a separate message 1010.

When the write data is passed along with the write request, the sender of the request (RN) has to obtain either implicit or explicit "credits" from the next destination for both the request and the data. On the other hand, in the case of the write data being sent separately (as indicated schematically in FIG. 10) typically the write request is used by the home node and by the memory controller as implicitly requesting a credit for the right data. Once the credit 1015 is received by the RN from the home node, the write data 1010 is sent by the RN to the home node. Similarly, a credit 1020 has to be received by the home node from the MC before the write data is forwarded from the home node to the MC.

Example embodiments involve the request being sent from the RN to the home node which in turn forwards it to the memory controller. This request is used as a request for credit from the requester to the memory controller. In turn, the memory controller sends a credit response directly to the requester (RN). The requester, after receiving the credit, sends data directly to the memory controller.

Figure 11:
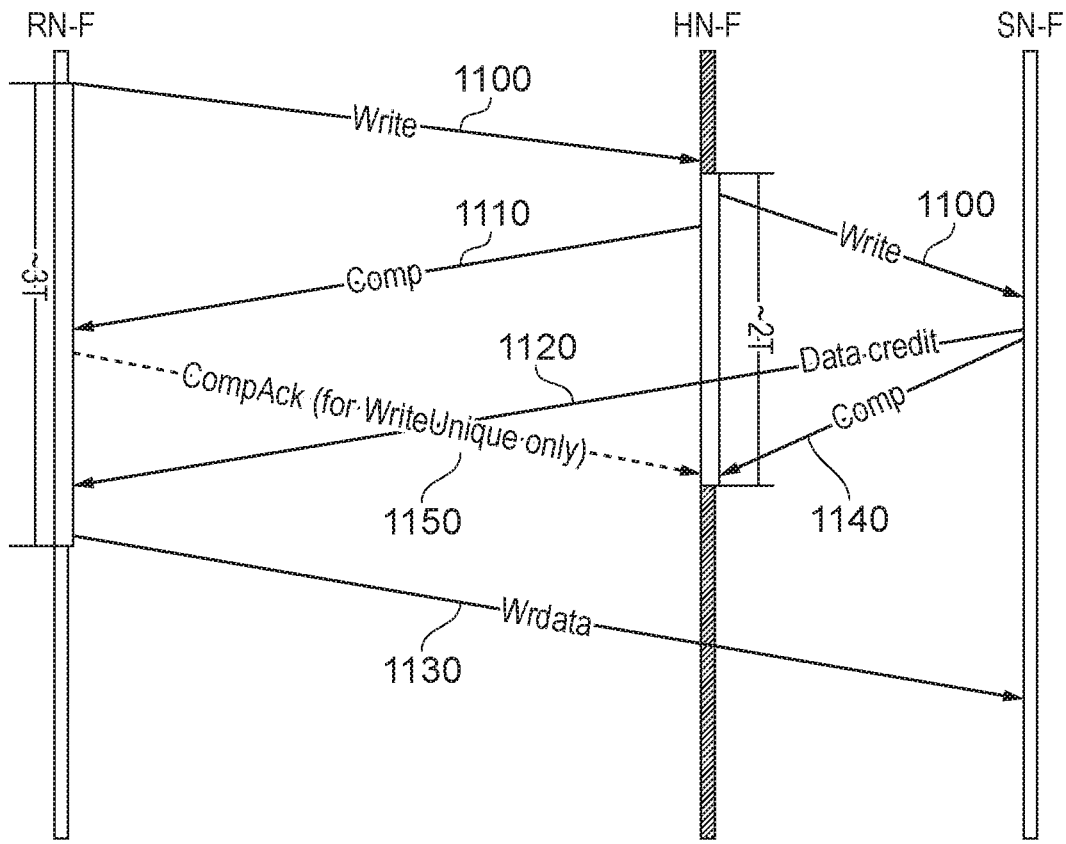
FIGS. 11 to 13 schematically illustrate write data transactions bypassing a home node.

FIG. 11 schematically illustrates an example of this technique. Referring to FIG. 11, a requesting node (such as a fully coherent requesting node RN-F) sends a write request 1100 to a fully coherent home node which forwards the write request 1100 to the target (SN-F) and also sends back a completion notification 1110 to the RN-F. The SN-F sends a data credit 1120 directly to the RN-F which responds by sending the write data 1130 directly to the SN-F.

In example arrangements, in addition to the data credit message to the RN-F, the recipient node SN-F also sends an acknowledgement message 1140 to the HN-F acknowledging receipt of the request.

A further acknowledgement 1150 can be sent from the RN-F to the home node after the requester RN-F receives the completion notification 1110 from the home node.

Therefore the arrangement of FIG. 1, operating according to the example of FIG. 11, represents an example of a data processing system comprising:

a master node to initiate data transmissions;
one or more slave nodes to receive the data transmissions; and
a home node to control coherency amongst data stored by the data processing system;
in which at least one data transmission from the master node to one of the one or more slave nodes bypasses the home node.

FIG. 11 (and FIGS. 12 and 13 to be discussed below) therefore provide examples in which, in respect of a data transmission from the master node to the one of the slave nodes, the slave node is configured to issue a credit for the data transfer, the credit being provided to the master node by a path which bypasses the home node.

Figure 12:
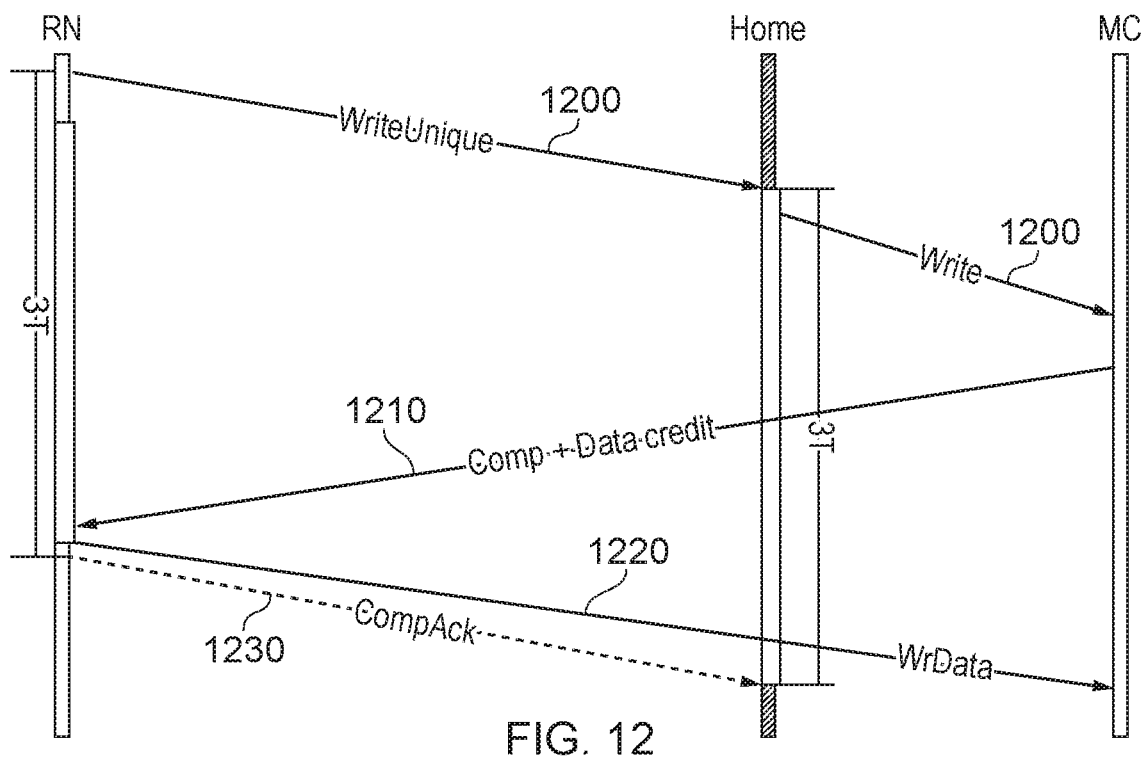
Figure 13:
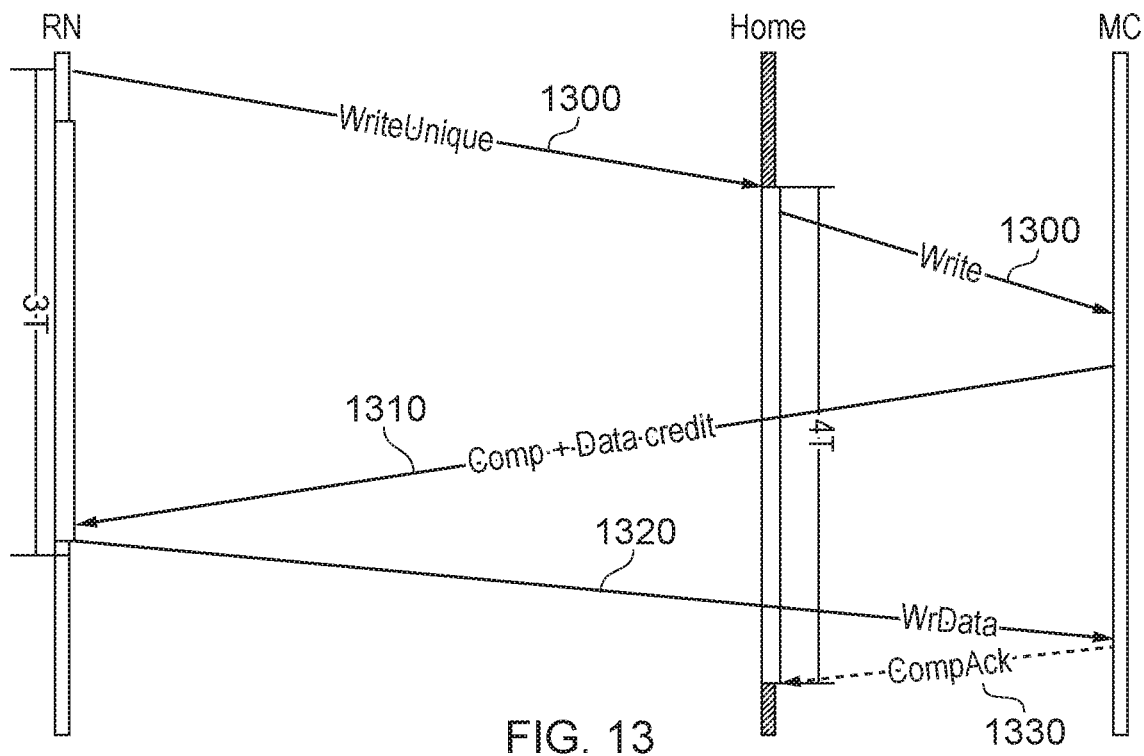

FIGS. 12 and 13 schematically illustrate variations of this technique.

In FIG. 12, a write request 1200 is sent by the RN to the home node and, as before, forwarded to the MC which then sends a single credit message 1210 including the data credit and completion notification. In response, the RN sends the write data 1220 directly to the MC and the acknowledgement 1230 to the home node. This is therefore an example in which in which the slave node is configured to issue a single message comprising the credit and an acknowledgement.

With reference to FIG. 13, again a write request 1300 is sent from the RN to the home node which forwards the write request to the MC. As in FIG. 12, a single data credit plus completion notification 1310 is sent by the MC to the RN which replies with the write data 1320. It is the MC which then sends a completion acknowledgement 1330 back to the home node to close the process.

These arrangements can apply to both coherent data writes ("write unique") and non-coherent ("write no SNP").

Example embodiments provide a number of potential advantages.

The home node does not need to process write data, which can in turn reduce the processing resources and/or buffering required at the home node.

The number of data messages at the interconnect for each write operation and in some instances potentially halved.

Data interleaving is potentially reduced by avoiding uploading and downloading data to and from the home node. The data packet receiver logic at the recipient node (such as the memory controller or SN-F) can perform more efficiently in respect of non-interleaved data.

A potentially greater request throughput via the home node can be achieved as well as potentially greater data throughput via the interconnect as a potentially more efficient flow of write data can be obtained.

FIG. 14 schematically illustrates interface circuitry comprising an interface 1400 to exchange data with a respective master node; a buffer 1410 to buffer at least one of address information from a received transmission request form a master node; and data from the received data transmission; and an interface 1420 to exchange data with other nodes. As discussed above, the interfaces 1400, 1410 can provide examples of circuitry to exchange information with a master node of a data processing system and with a home node and one or more slave nodes, the home node controlling coherency amongst data stored by the data processing system. The interface circuitry may be configured to receive a transmission request and a data transmission from the master node according to a first data transfer protocol and to transfer data from the received data transmission to a given slave node according to a second, different, data transfer protocol. In some examples, the interface circuitry may be configured to generate a transmission message, for transmission to a given slave node, the transmission message including at least memory address information from transmission request received from the master node and data from the data transmission received from the master node.

FIG. 15 is a schematic flowchart illustrating a data processing method comprising:

(at a step 1500) a master node initiating data transmissions to one or more slave nodes;

(at a step 1510) a home node controlling coherency amongst data stored at the one or more slave nodes; and (at a step 1520) the master node transmitting data to one of the one or more slave nodes bypassing the home node.

FIG. 16 is a schematic flowchart illustrating a method comprising:

(at a step 1600) providing interface circuitry to exchange information with a master node of a data processing system and with a home node and one or more slave nodes, the home node controlling coherency amongst data stored by the data processing system; and (at a step 1610) the interface circuitry receiving a transmission request and a data transmission from the master node according to a first data transfer protocol and transferring data from the received data transmission to a given slave node according to a second, different, data transfer protocol.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Interface circuitry comprising:
   circuitry to exchange information with a master node of a data processing system and with a home node and one or more slave nodes, the home node controlling coherency amongst data stored in a shared memory accessible by the home node and accessible by the master node, and the one or more slave nodes via the home node;
   the interface circuitry being configured to receive a transmission request and a data transmission from the master node according to a first data transfer protocol and to transfer data from the received data transmission to a given slave node according to a second, different, data transfer protocol, wherein:
   one of the first data transfer protocol and the second data transfer protocol is a protocol in which coherency is maintained using the home node, and
   the other of the first data transfer protocol and the second data transfer protocol is a protocol in which coherency is maintained without the use of a home node.

2. Interface circuitry according to claim 1, in which the interface circuitry is configured to generate a transmission message, for transmission to a given slave node, the transmission message including at least memory address information from transmission request received from the master node and data from the data transmission received from the master node.

3. Interface circuitry according to claim 1, in which the interface circuitry is configured, in response to receiving an acknowledgement from the given slave node of a data transmission, to provide an acknowledgement to the home node.

4. Interface circuitry according to claim 1, in which the home node is configured to serialise transmission requests and access requests to the one or more slave nodes so that data written to a memory address at a slave node is consistent with data read from that memory address in response to a subsequent access request.

5. Interface circuitry according to claim 4, in which the home node is configured, in response to serialisation of a given transmission request requesting a data transmission to a given slave node of the one or more slave nodes, to issue an authorisation indicating that the data transmission corresponding to the given transmission request should be made directly to the given slave node.

6. Interface circuitry according to claim 5, in which the authorisation issued by the home node includes a source node identifier and a target node identifier; and
   the source node identifier indicates that the given slave node was the source of the authorisation.

7. Interface circuitry according to claim 1, in which one of the first data transfer protocol and the second data transfer protocol is a Coherent Hub Interface (CHI) protocol, and the other of the first data transfer protocol and the second data transfer protocol is an=Advanced Extensible Interface (AXI or AXI Coherency Extensions (ACE) data transfer protocol.

8. A method comprising:
   providing interface circuitry to exchange information with a master node of a data processing system and with a home node and one or more slave nodes, the home node controlling coherency amongst data stored in a shared memory accessible by the home node and accessible by the master node, and the one or more slave nodes via the home node;
   the interface circuitry receiving a transmission request and a data transmission from the master node according to a first data transfer protocol and transferring data from the received data transmission to a given slave node according to a second, different, data transfer protocol, wherein:
   one of the first data transfer protocol and the second data transfer protocol is a protocol in which coherency is maintained using the home node, and
   the other of the first data transfer protocol and the second data transfer protocol is a protocol in which coherency is maintained without the use of a home node.

* * * * *